UNITED STATES PATENT OFFICE.

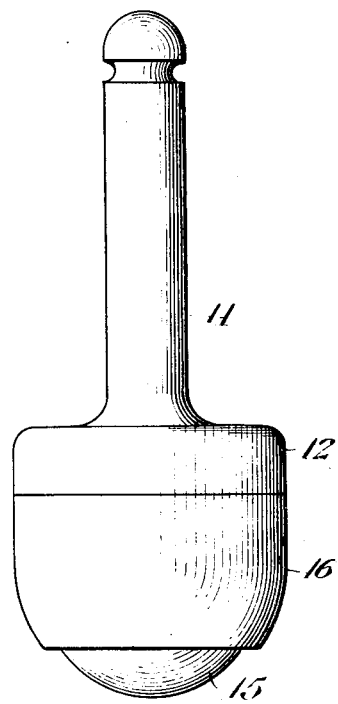
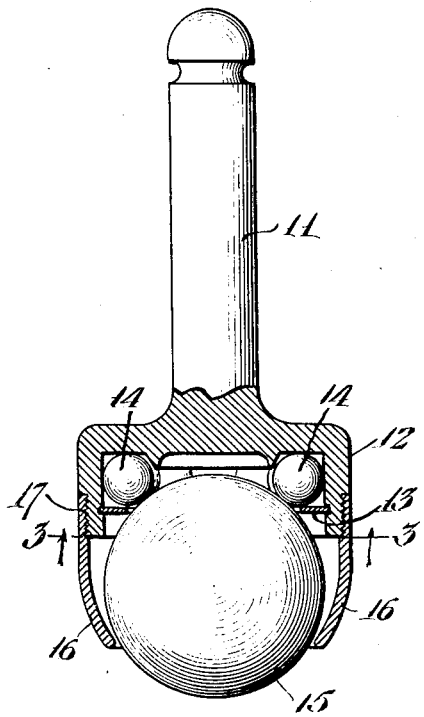
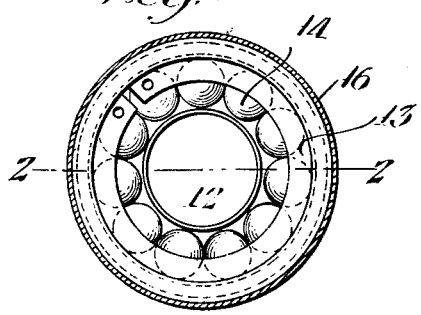
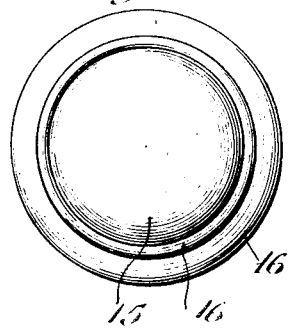

VICTOR H. YORK, OF WILSON, OKLAHOMA.

CASTER.

1,412,499.  Specification of Letters Patent.  Patented Apr. 11, 1922.

Application filed December 18, 1920. Serial No. 431,733.

*To all whom it may concern:*

Be it known that I, VICTOR H. YORK, a citizen of the United States, residing at Wilson, county of Carter, and State of Oklahoma, have invented a new and useful Caster, of which the following is a specification.

My invention relates to anti-friction devices such as casters and the like which are adapted to support loads in such a manner that they can be rolled over surfaces without undue friction.

Further objects and advantages will be made evident hereinafter.

Referring to the drawing which is for illustrative purposes only,

Fig. 1 is a side elevation of one embodiment of my invention.

Fig. 2 is a similar embodiment partly in section on a plane represented by the line 2—2 of Fig. 3.

Fig. 3 is a section on a plane represented by the line 3—3 of Fig. 2, the large ball being omitted for the sake of clearness.

Fig. 4 is a plan view as seen from below.

In the form of the invention illustrated in the drawings 11 is a shank having a head 12 secured thereto. Secured in the head 12 is a retainer 13 behind which a series of small balls 14 are free to turn. A large ball 15 is secured in place by a retainer 16 threaded to the head 12 as shown at 17. The large ball 15 is pressed upwardly in contact with the small balls 14 which turn in suitable raceways formed in the head 12.

While I have shown a shank 11 which is suited to go into an opening in the leg of a piece of furniture, it is to be understood that my invention covers any embodiment in which the head 12 is secured to the device which it is desired to be supported.

It is also to be understood that while I have shown one method of supporting and guiding the balls 14, that various methods may be used in place thereof without departing from the spirit of my invention.

I claim as my invention:

A caster comprising a shank having a head secured thereto, said head having an exterior thread on its lower end and a small recess in a central cavity; a large ball extending into said cavity; a retainer threaded on said exterior thread on said head; a split ring sprung into the recess in said cavity and a plurality of small balls above said split ring.

In testimony whereof, I have hereunto set my hand at Wilson, Oklahoma, this 9 day of December, 1920.

VICTOR H. YORK.